US009556684B2

(12) United States Patent
Beckstrom

(10) Patent No.: US 9,556,684 B2
(45) Date of Patent: Jan. 31, 2017

(54) COVER ASSEMBLY FOR A DIRECTIONAL DRILLING MACHINE

(71) Applicant: BECKSTROM CONSTRUCTION, INC., Fosston, MN (US)

(72) Inventor: Gerald Beckstrom, Alleman, IA (US)

(73) Assignee: Beckstrom Construction, Inc., Fosston, MN (US)

( * ) Notice: Subject to any disclaimer, the term of this patent is extended or adjusted under 35 U.S.C. 154(b) by 289 days.

(21) Appl. No.: 14/190,174

(22) Filed: Feb. 26, 2014

(65) Prior Publication Data
US 2015/0239330 A1    Aug. 27, 2015

(51) Int. Cl.
*E21B 15/04*    (2006.01)
*B60J 7/10*    (2006.01)

(52) U.S. Cl.
CPC ............. *E21B 15/04* (2013.01); *B60J 7/102* (2013.01)

(58) Field of Classification Search
CPC ....... E21B 15/04; B60J 7/102; B62D 33/0621; B62D 33/077
See application file for complete search history.

(56) References Cited

U.S. PATENT DOCUMENTS

| | | | | | |
|---|---|---|---|---|---|
| 2,532,948 | A | * | 12/1950 | Sanden | B62D 33/0621 296/102 |
| 2,804,951 | A | * | 9/1957 | Kolt | E21B 15/00 135/115 |
| 3,017,935 | A | * | 1/1962 | Galbraith | E02F 9/24 173/159 |
| 3,417,884 | A | * | 12/1968 | Edwards | A01D 46/20 280/32.5 |
| 3,977,636 | A | * | 8/1976 | Bumueller | B62D 49/02 188/170 |
| 5,217,275 | A | * | 6/1993 | Ridge | B60J 9/00 150/166 |
| 5,709,276 | A | * | 1/1998 | Lee | E21B 7/046 173/185 |
| 6,530,617 | B2 | * | 3/2003 | McElwee | B62D 33/0621 280/770 |
| 2007/0050958 | A1 | * | 3/2007 | Scruggs | A61G 17/02 27/2 |
| 2013/0062169 | A1 | * | 3/2013 | Johannsen | B65G 41/002 198/860.5 |

* cited by examiner

*Primary Examiner* — Shane Bomar
(74) *Attorney, Agent, or Firm* — Zarley Law Firm, P.L.C.

(57) ABSTRACT

A cover assembly having a frame with a base, a plurality of support members that extend upwardly from the base, a plurality of horizontal braces that are connected to and extend between the support members, and a pair of generally vertical braces that extend between the forward most support member and a machine. A cover is fitted over the support members and is connected to the base using a plurality of fastening members.

10 Claims, 2 Drawing Sheets

COVER ASSEMBLY FOR A DIRECTIONAL DRILLING MACHINE

BACKGROUND OF THE INVENTION

This invention is directed to a cover assembly, and more particularly to a cover assembly for a directional drilling machine.

Directional drilling machines are well known in the art. Typically, use of a directional drilling machine is limited by outdoor weather conditions for at least two reasons. One reason is that it becomes difficult for an operator of a drilling machine to withstand cold weather conditions for an extended period of time. Second, in cold weather, water used to cool the tips of the drill rods is susceptible to freezing. Water is also used to lubricate the drill hole and to flush out the cuttings when back reaming. Freezing can also inhibit mud that is intentionally created under certain soil conditions from a combination of bentonite and water. Therefore, a need exists in the art for a device that addresses these deficiencies.

An objective of the present invention is to provide a cover assembly that permits operation of a directional drilling machine in cold weather.

Another objective of the present invention is to provide a cover assembly that prevents water used when operating a directional drilling machine from freezing.

These and other objectives will be apparent to one of ordinary skill in the art based upon the following written description, drawings, and claims.

SUMMARY OF THE INVENTION

A cover assembly having a frame with a base, a plurality of support members that extend upwardly from the base, a plurality of horizontal braces that are connected to and extend between the support members, and a pair of generally vertical braces that extend between the forward most support member and a machine. A cover is fitted over the support members and is connected to the base using a plurality of fastening members.

DETAILED DESCRIPTION OF THE PREFERRED EMBODIMENTS

Figure 1:
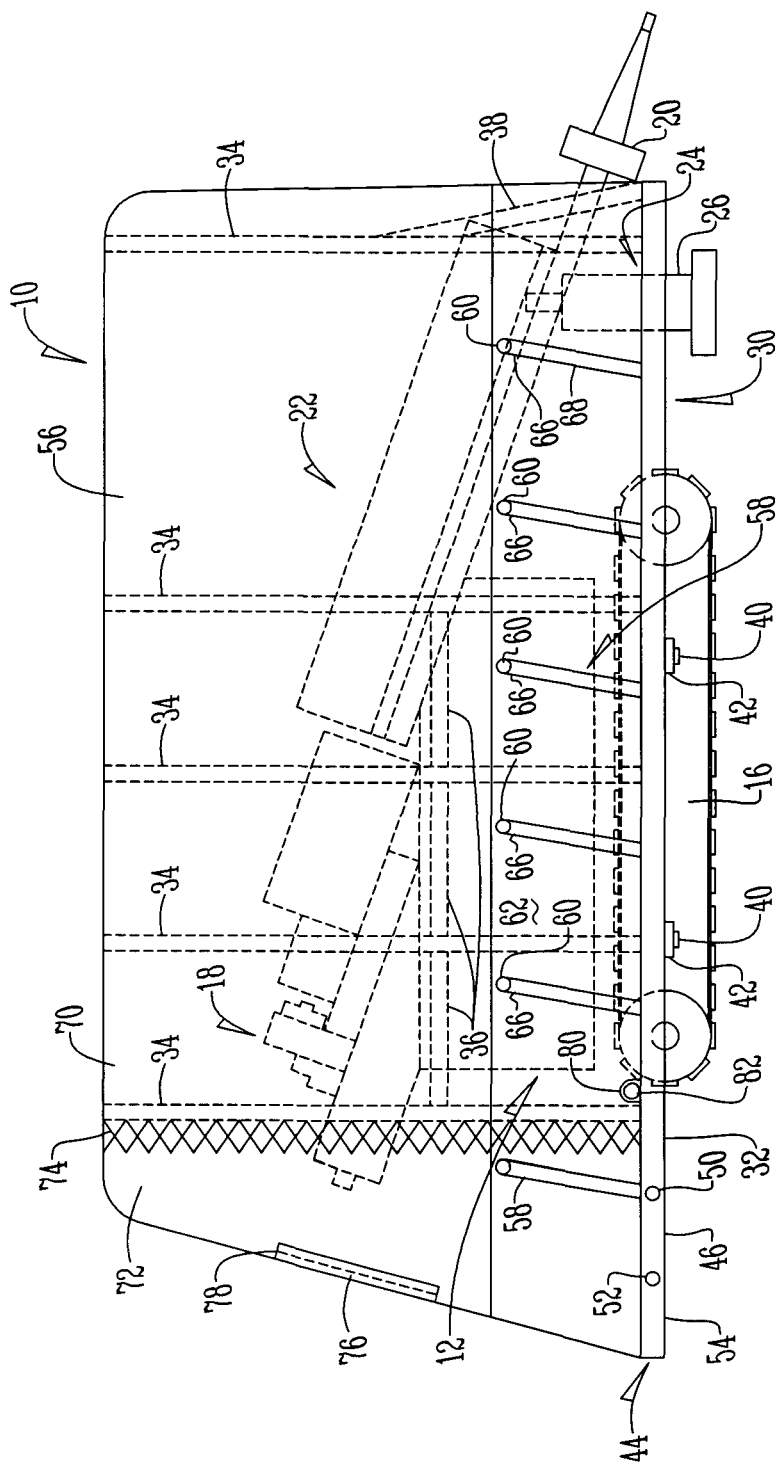
FIG. 1 is a side view of a cover assembly for a directional drilling machine.
Figure 2:
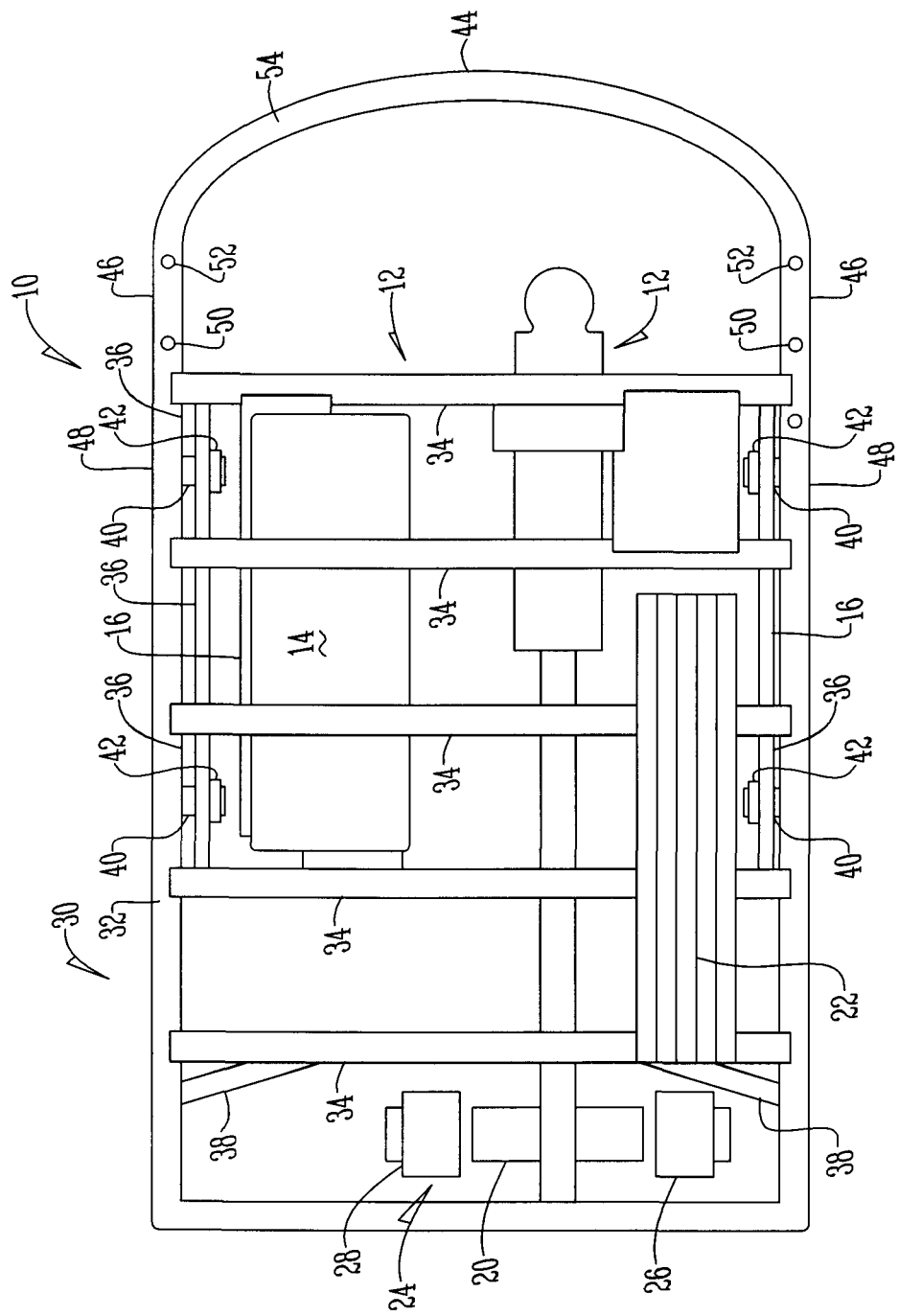
FIG. 2 is a top plan view for a directional drilling machine.

Referring to the Figures, a cover assembly 10 is disclosed for use in connection with a directional drilling machine 12. The drilling machine 12 has a chassis 14 that is moveably supported by tracks 16. The chassis 14 supports a drill string drive assembly 18 and a break out mechanism 20. The drilling machine 12 also includes a drill rod load assembly 22. The down hole end of chassis 14 is connected to an anchoring mechanism 24 that secures the chassis to the ground using a pair of stake downs 26 and 28.

The cover assembly 10 includes a frame 30 that is removably connected to the drilling machine 12. The frame 30 includes a base 32, a plurality of support members 34, a plurality of horizontal braces 36 that are connected to and extend between the support members 34, and a plurality of generally vertical braces 38. The frame 30 is connected to the drilling machine 12 in any manner and preferably extensions 40 extend inwardly from the base 32 or support members 34 and are received within slots 42 in the tracks 16 of the drilling machine 12.

The base 32 surrounds the lower portion of the drilling machine 12. At the rearward end 44 of the base 32 are a pair of pivot members 46 that are connected to an elongated section 48 of the base 32 about a pair of first pivot pins 50. Pivotally connected to the pivot members 46 about a pair of second pivot pins 52 is an end base section 54 that preferably is arcuate. The pivot members 46 and end section 54 are connected in such a way that generally they lie in the same horizontal plane as the elongated section 48 and pivot upwardly as needed when the drilling machine 12 is moved.

The support members 34 are connected to the elongated section 48 of the base 32. The support members 34 extend upwardly and form an arch that provides sufficient space for an individual to fit within the support members 34 and for the drilling machine 12 to operate freely. Preferably the cover assembly 10 has four support members 34. Extending between and connected to the rearward support members 34 are horizontal brace members 36 that provide support and stability to the support members 34. Vertical braces 38 are connected to the forward most support member 34 and extend from the forward most support member 34 to a fixed part of the drilling machine 12. The positioning of the vertical braces permit movement of the stake downs 26 and 28 of the anchoring mechanism 24.

Extending over the support members 34 and connected to the base 32 is a cover 56. The cover 56 is made of a flexible material and is connected to the base using a plurality of fastening members 58. The fastening members 58 is of any type and preferably are comprised of a ring 60 that is attached to the exterior 62 of the cover 56 in spaced relation to a lower edge 64 of the cover 56. The ring 60 receives hooks 66 that are attached to opposite ends of a resilient member 68 such as a bungee cord.

The cover 56 is of one piece or alternatively has a forward 70 and rear 72 sections that are connected along a seam 74. Preferably, the seam 74 is positioned just forward of the first pivot pins 50. The rear section 72 is connected to the forward section 70 in such a way that the rearward section is easily removed. The rear section 72 has an access opening 76 having a door 78. Finally, the cover 56 has an opening 80 that receives an exhaust tube 82 that is connected to the engine of the drilling machine 12.

In operation, the frame 30 is secured to the drilling machine 12 by inserting the extensions 40 into the slots 42 of the tracks 16 of the drilling machine 12. The cover 56 is placed over the support members 34 of the frame and connected to the base 32 using the fastening members 58. More specifically, a hook 66 attached to one end of a bungee cord 68 is connected to a ring 60. The bungee cord 68 is then wrapped around the base 32 and the hook 66 at the opposite end of the cord 66 is attached to the same ring 60. Finally, the exhaust tube 82 is inserted through opening 80.

The drilling machine 12 is then moved to perform a drilling function. When the drilling machine encounters an uphill grade, the rearward end of the frame 30, which includes the pivot members 46 and end section 54 of the base will pivot upwardly. The heat from the engine of the drilling machine 12 provides sufficient heat to keep an operator warm within the cover on a cold day and also prevent the water used to cool the tips of the drilling rods from freezing. For example, when the temperature outside is approximately 20° F., the temperature within the cover 56 can be as much as 70° F. If the temperature within the cover 56 becomes too high, the rear section 72 of the cover 56 can be removed.

What is claimed is:

1. A cover assembly, comprising:
   a frame having a base and support members connected to a machine;
   a cover member that fits over the frame;
   a plurality of fastening members that connect the cover to the frame;
   wherein the base comprises an elongated section, pivot members pivotally connected to the elongated section, and an end section pivotally connected to the pivot members; and
   wherein the end section is pivotally connected to the pivot members such that the end section and pivot members generally lie in the same horizontal plane as the elongated section.

2. The cover assembly of claim 1 wherein the base surrounds the machine and the support members extend upwardly and over the machine.

3. The cover assembly of claim 2 wherein the frame includes a plurality of horizontal braces that are connected to and extend between the support members.

4. The cover assembly of claim 2 wherein a pair of generally vertical base members are connected to the machine and a forward most support member.

5. The cover assembly of claim 1 wherein the machine is a directional drilling machine.

6. The cover assembly of claim 1 wherein the frame has extensions that are received within slots on the machine.

7. The cover assembly of claim 1 wherein the cover section has a forward section and a rear section.

8. The cover assembly of claim 1 wherein the plurality of fastening members include a ring attached to the cover and a resilient member having hooks at each end.

9. The cover assembly of claim 1 wherein the pivot members and end section pivot upwardly when the machine encounters an uphill grade when in motion.

10. A cover assembly, comprising:
    a frame having a base and support members connected to a machine:
    a cover member that fits over the frame;
    a plurality of fastening members that connect the cover to the frame;
    wherein the base comprises an elongated section, pivot members pivotally connected to the elongated section, and an end section pivotally connected to the pivot members; and
    wherein the cover member has an opening that receives an exhaust tube connected to an engine of the machine.

* * * * *